United States Patent

Tien

[11] Patent Number: 6,020,700
[45] Date of Patent: Feb. 1, 2000

[54] DC BRUSHLESS MOTOR DRIVE CIRCUIT HAVING INPUT SIGNAL COMPATABILITY TO HALL EFFECT ICS AND HALL SENSORS

[75] Inventor: Chien-Kuo Tien, Taipei, Taiwan

[73] Assignee: Silicon Touch Technology Inc., Hsinchu, Taiwan

[21] Appl. No.: 09/116,490

[22] Filed: Jul. 16, 1998

[51] Int. Cl.[7] ...................................................... H02P 7/00
[52] U.S. Cl. ............................................. 318/254; 318/439
[58] Field of Search .................................... 318/254, 434, 318/138, 696, 636, 685, 638, 701, 647, 562; 388/803, 811, 815; 73/1.41, 1.84, 862, 322, 326; 324/207.13, 207.14, 207.15, 207.2, 207.25

[56] References Cited

U.S. PATENT DOCUMENTS

| | | | |
|---|---|---|---|
| 4,966,041 | 10/1990 | Miyazaki | 73/862.191 |
| 5,250,881 | 10/1993 | Yoshino | 318/254 |
| 5,598,074 | 1/1997 | Huang | 318/439 |
| 5,604,412 | 2/1997 | Okada et al. | 318/254 |
| 5,734,241 | 3/1998 | Okada et al. | 318/366 |
| 5,747,952 | 5/1998 | Izawa et al. | 318/135 |
| 5,804,936 | 9/1998 | Brodsky et al. | 318/254 |
| 5,901,268 | 5/1999 | Ando et al. | 318/439 |

*Primary Examiner*—Jonathan Salata
*Attorney, Agent, or Firm*—Rosenberg, Klein & Lee

[57] ABSTRACT

A motor drive circuit includes an amplifying and comparing circuit, a multiplexer, an input control circuit and a drive pulse generator. The amplifying and comparing circuit receives an output signal from a Hall element and generates an amplified output signal. The input control circuit detects whether the Hall element is a Hall sensor or a Hall IC for controlling the multiplexer to have its output from either the Hall IC or the amplifying and comparing circuit. The drive pulse generator has an input connected to the output of the multiplexer, and has four outputs connected to four MOS transistors respectively for generating clock signals to drive the four MOS transistors to provide driving current to the motor.

6 Claims, 8 Drawing Sheets

DC BRUSHLESS MOTOR DRIVE CIRCUIT HAVING INPUT SIGNAL COMPATABILITY TO HALL EFFECT ICS AND HALL SENSORS

BACKGROUND OF THE INVENTION

1. Field of the Invention

Figure 9:
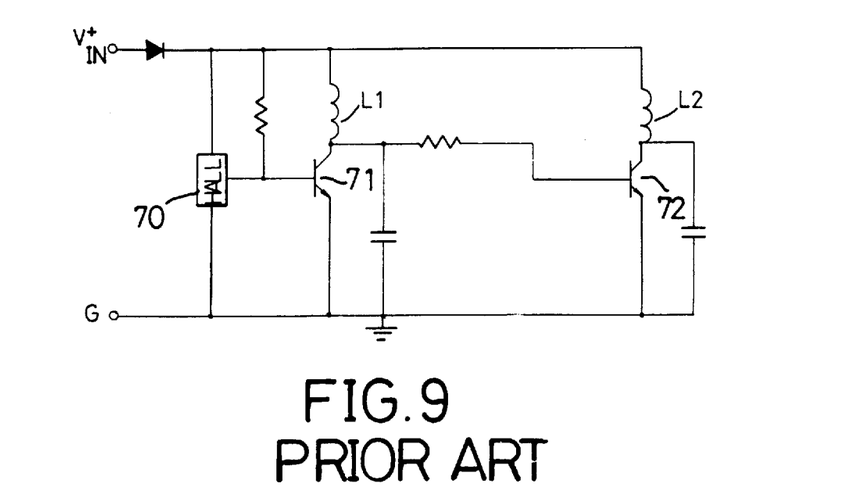
FIG. 9 is a circuit diagram of a conventional two-phase DC brushless motor drive circuit.

The present invention relates to a motor drive circuit for a DC brushless motor; more particularly, the present invention relates to a CMOS motor drive circuit with high torque, good noise immunity and high efficiency, 2. Description of Related Art The conventional DC brushless motor makes use of two stator coils for generating a rotating magnetic field to rotate the rotor of a fan. FIG. 9 shows a motor drive circuit for such a two-phase DC brushless motor. The motor drive circuit comprises a Hall effect element (Hall IC) (70) for detecting the polarity of a rotor formed from a permanent magnet in the motor, a first transistor (71) connected to a first magnetic coil (L1), and a second transistor (72) connected to a second magnetic coil (L2). In use of the motor drive circuit of FIG. 9, when the motor is powered on, the first transistor (71) is turned on and current is supplied to the first magnetic coil (L1) thereby generating a magnetic field to rotate the rotor. Then, the Hall IC (70) detects the change of magnetic polarity caused by the rotation of the rotor thereby generating a high level signal to turn off the first transistor (71) and turn on the second transistor (72) to supply current to the second magnetic coil (L2). The magnetic coil (L2) generates a magnetic field to further rotate the rotor. Consequently, the first transistor (71) and the second transistor (72) are alternatively turned on and turned off to supply current to the first magnetic coil (L1) and second magnetic coil (L2) respectively thereby continuously rotating the rotor.

Figure 10:
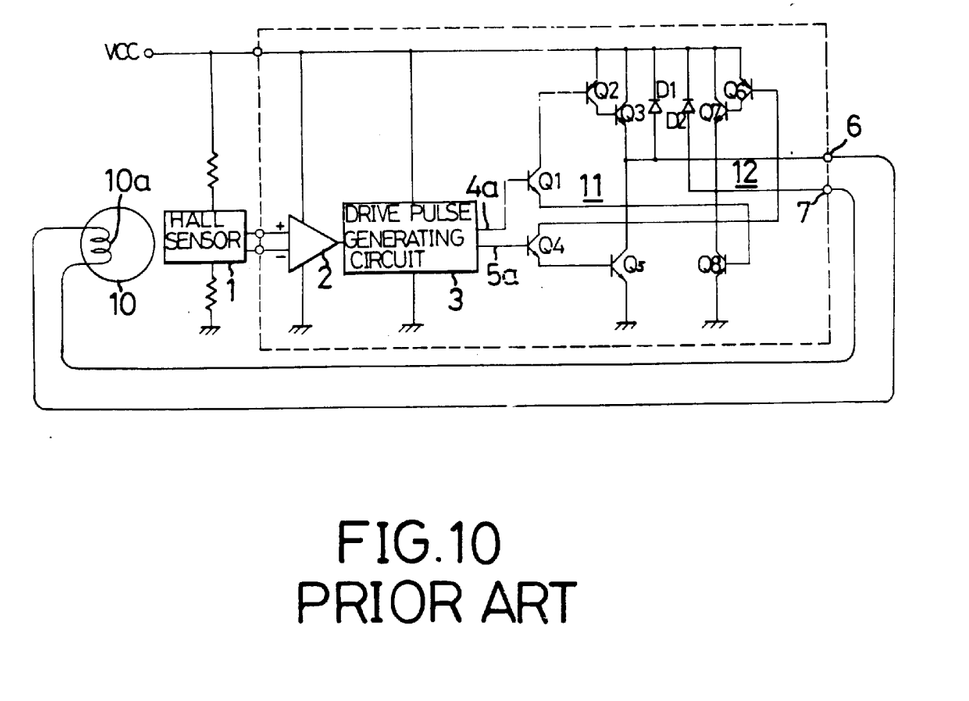
FIG. 10 is a circuit diagram of a motor drive circuit disclosed in the U.S. Pat. No. 5,289,089.

The above conventional two-phase DC brushless motor suffers a disadvantage in having two stator coils, which results in higher manufacturing cost and larger motor dimensions. Therefore, there is a demand for having a single-phase DC brushless motor with a single coil. However, the above conventional motor drive circuit can not be used to drive such a single-phase motor. To overcome this problem, the U.S. Pat. No. 5,289,089 by Aoki discloses a motor drive circuit capable of driving both of the single-phase and two-phase motors. As shown in FIG. 10, this motor drive circuit comprises a Hall effect element (Hall sensor) (1), an amplifier (2) which receives output signals of the Hall sensor (1), and a drive pulse generating circuit (3) which receives the amplified signals of the amplifier (2), wherein the outputs of the drive pulse generating circuit (3) are connected to first and second drive circuits (11,12) which differ in phase. The first drive circuit (11) is constituted by transistors Q1 to Q3 and Q8 while the second drive circuit (12) is constituted by transistors Q4 to Q7. Further, switching diodes D1 and D2 are provided in parallel with the transistors Q3 and Q7 respectively. The emitters of the transistors Q3 and Q7 are connected to external terminals 6 and 7 respectively for further connection to a coil (10). In operation, the drive pulse generating circuit receives the amplified signal from the amplifier (2), generates first and second pulses having a duty of about 50% of which phases differ by about 180 degrees from each other and outputs the same. The first and second drive circuits respectively receive the first and second pulses and serve alternatively as a current flow out side and as current sink side with respect to each other to drive the motor. In addition to driving a single-phase motor as shown in FIG. 9, this motor drive circuit can be used to drive a two-phase motor by connecting two first terminals of the motor's two coils to external terminals 6 and 7 respectively and connecting two second terminals thereof to a power line Vcc.

Although Aoki's patent can be used to drive either a single-phase or a two-phase motor and thus overcomes the disadvantages of the conventional motor drive circuit for a two-phase motor, however, some unsatisfactory points still exist:

1. Restriction in use of the Hall element: It is well known that a Hall element can be either a Hall sensor or a Hall IC wherein the two differ in that the Hall IC further provides a signal amplifying capability so that the output signals of the Hall IC can be applied to circuitry without amplification. In the Aoki Patent, the amplifier 2 is provided in the motor drive circuit to amplify the output of the Hall element which is known to be a Hall sensor. Therefore, the Hall element of the Aoki Patent can not be a Hall IC.

2. Redundancy in circuit architecture: The diodes D1 and D2 connected in parallel with the transistors Q3 and Q7 respectively are provided to avoid generating switching noise resulting from the counter electromotive force on the motor coil (10). However, if the motor drive circuit is implemented in an IC, the two diodes (D1,D2) have to be built-in and require a significant area, resulting in a complicated manufacturing process and high manufacturing cost.

3. Short usage life: The major reason that makes a motor drive circuit over-heat and thus shortens its life is that the transistors therein are alternatively turned on and off. It is known that a delay may occur when an electronic element makes a transition. Therefore, if a delay occurs when a first transistor transits from on to off, a corresponding second transistor turns on before the first transistor is entirely turned off, which results in short-circuit and over-heating problems thereby shortening the life of the motor drive circuit.

4. Large power dissipation: Aoki's single-phase motor drive circuit includes bipolar devices in an IC form. Since the characteristics of PNP transistors are not as good as NPN transistors in most bipolar processes, Aoki's patent employs two NPN transistors (Q3,Q7) as pull up devices. However, there is a voltage drop $V_{BE\backslash Q3}+V_{CE\backslash Q2}$ approximately equal to 1.0 volt generated between the power source Vcc and the external terminal 6. Similarly, a voltage drop $V_{BE\backslash Q7}+V_{CE\backslash Q6}$ approximately equal to 1.0 volt is also generated between the power source Vcc and the external terminal 7. These voltage drops will result in larger power dissipation and generate more heat.

5. Easy to be disturbed by noise: The output signals of the Hall sensor (1) in Aoki's patent are directly sent to the drive pulse generating circuit (3) after amplifification. There is no error detecting mechanism provided. Therefore, the motor drive circuit is likely to make mistakes if disturbed by noise.

Based on the unsatisfactory points described above, there is a need to improve the motor drive circuit

SUMMARY OF THE INVENTION

In the view of the foregoing disadvantages and unsatisfactory points in the known types of motor drive circuit present in the related art, the present invention provides an improved motor drive circuit. As such, the general purpose of the present invention is to provide a new and improved motor drive circuit which has all the advantages of the related art and none of the disadvantages.

To attain this, the present invention provides a motor drive circuit which comprises an amplifying and comparing circuit for receiving an output signal of a Hall element generating an amplified output signal at an output; a multiplexer having two inputs respectively connected to the Hall element and the output of the amplifying and comparing circuit for selecting a connection from one of said two inputs to an output of the multiplexer; an input control circuit for detecting the type of the Hall element to control the multiplexer; and a drive pulse generator having an input connected to the output of the multiplexer and has four outputs connected to four MOS transistors respectively for generating clock signals to drive the four MOS transistors to provide driving signals to the motor.

Other objects, advantages, and novel features of the invention will become more apparent from the following detailed description when taken in conjunction with the accompanying drawings.

DETAILED DESCRIPTION OF PREFERRED EMBODIMENT

Figure 1:
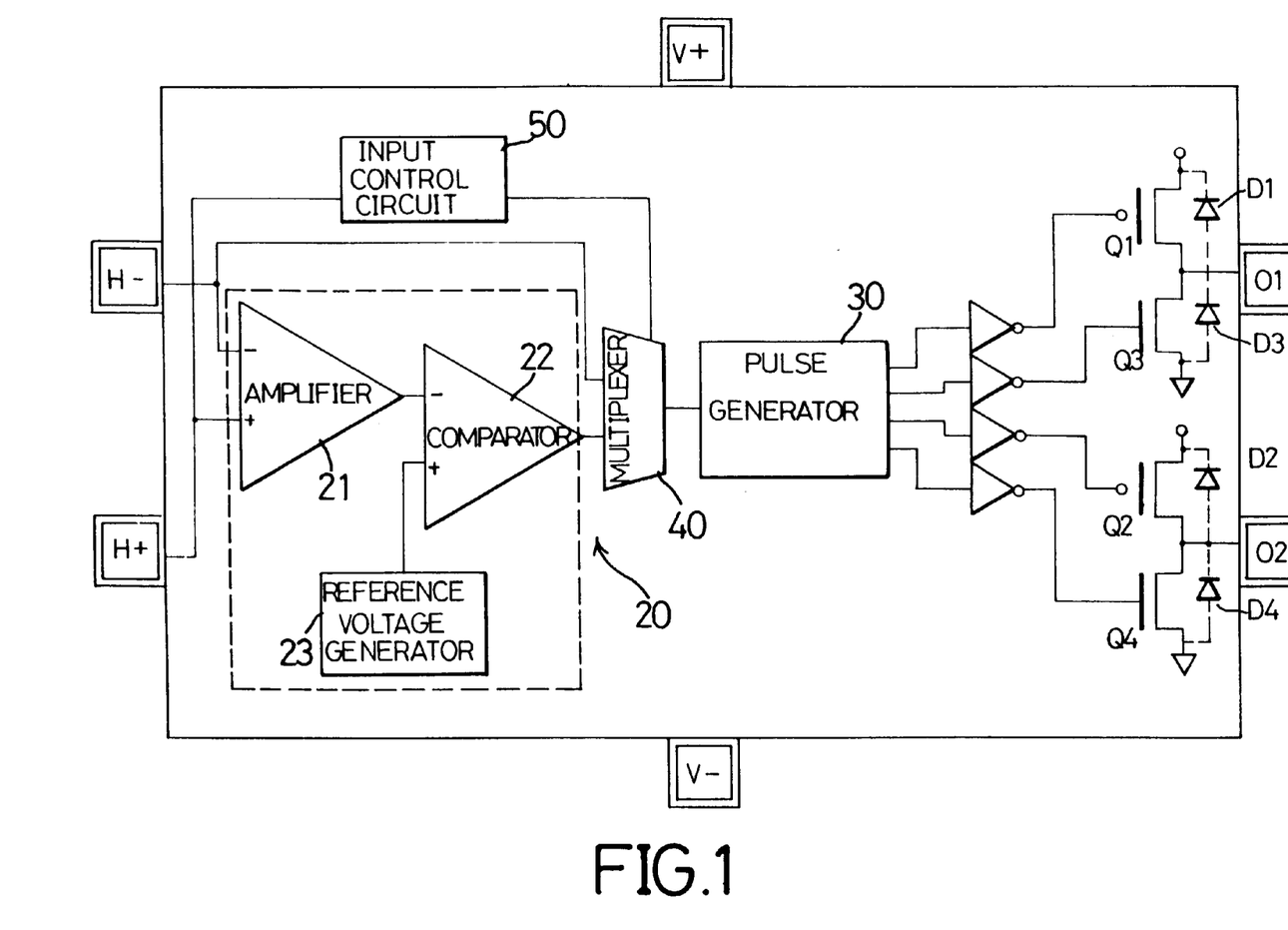
FIG. 1 is a circuit diagram of a motor drive circuit in accordance with the present invention.

FIG. 1 shows the circuit diagram of a motor drive circuit for a DC brushless motor in accordance with the present invention, which includes an amplifying and comparing circuit (20), a pulse generator (30), four transistors (Q1,Q2,Q3,Q4) connected to the outputs of the pulse generator (30). The amplifying and comparing circuit (20) further comprises an amplifier (21) and a comparator (22) wherein the amplifier (21) has two inputs connected to two signal input terminals (H+,H-) to further connect to a Hall element which may be a Hall sensor or a Hall IC.

The output of the amplifier (21) is connected to the negative input of the comparator (22) while the positive input of the comparator (22) is connected to a reference voltage generator (23) whereby the comparator (22) is able to compare the output signal from the amplifier (21) with a reference voltage and provide noise rejection capability based on a switching hysteresis characteristic. Thus, the accuracy in operating the motor drive circuit is obtained.

The pulse generator (30) has an input connected to the signal input terminal H– or the output of the amplifying and comparing circuit (20) via a multiplexer (40). The multiplexer (40) is controlled by an input control circuit (50) to determined whether the input of the pulse generator (30) is connected to the signal input terminal H– or the output of the amplifying and comparing circuit (20).

The input control circuit (50) is connected between the signal input terminal H+ and the multiplexer (40). By detecting the voltage level at the signal input terminal H+, whether the Hall element connected to the signal input terminals (H+,H–) is a Hall sensor or a Hall IC can be known.

Figure 2:
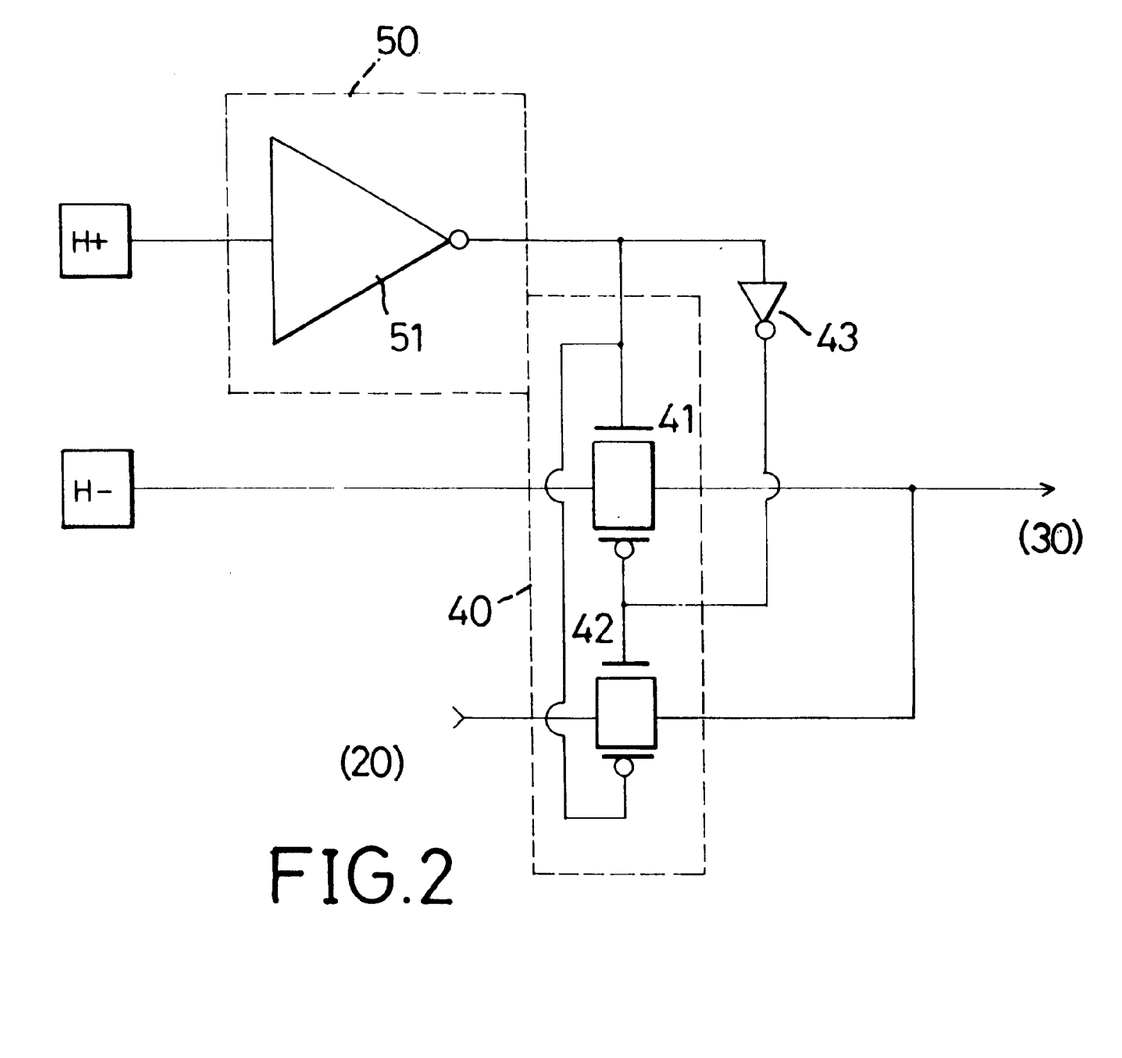
FIG. 2 is a circuit diagram of an input control circuit of the motor drive circuit in accordance with the present invention.

FIG. 2 shows the structure of the input control circuit (50) and the multiplexer (40) wherein the input control circuit (50) is an inverter (51) with low transition level and the multiplexer (40) is constituted by two electronic switches (41,42). The input of the inverter (51) is connected to the signal input terminal H+ and the output thereof is connected to two electronic switches (41,42) via an inverter 43. The two electronic switches (41,42) have two first terminals connected to a common terminal for further connecting to the pulse generator (30) while the two second terminals thereof are respectively connected to the signal input terminal H– and the output of the amplifying and comparing circuit 20.

Figure 3:
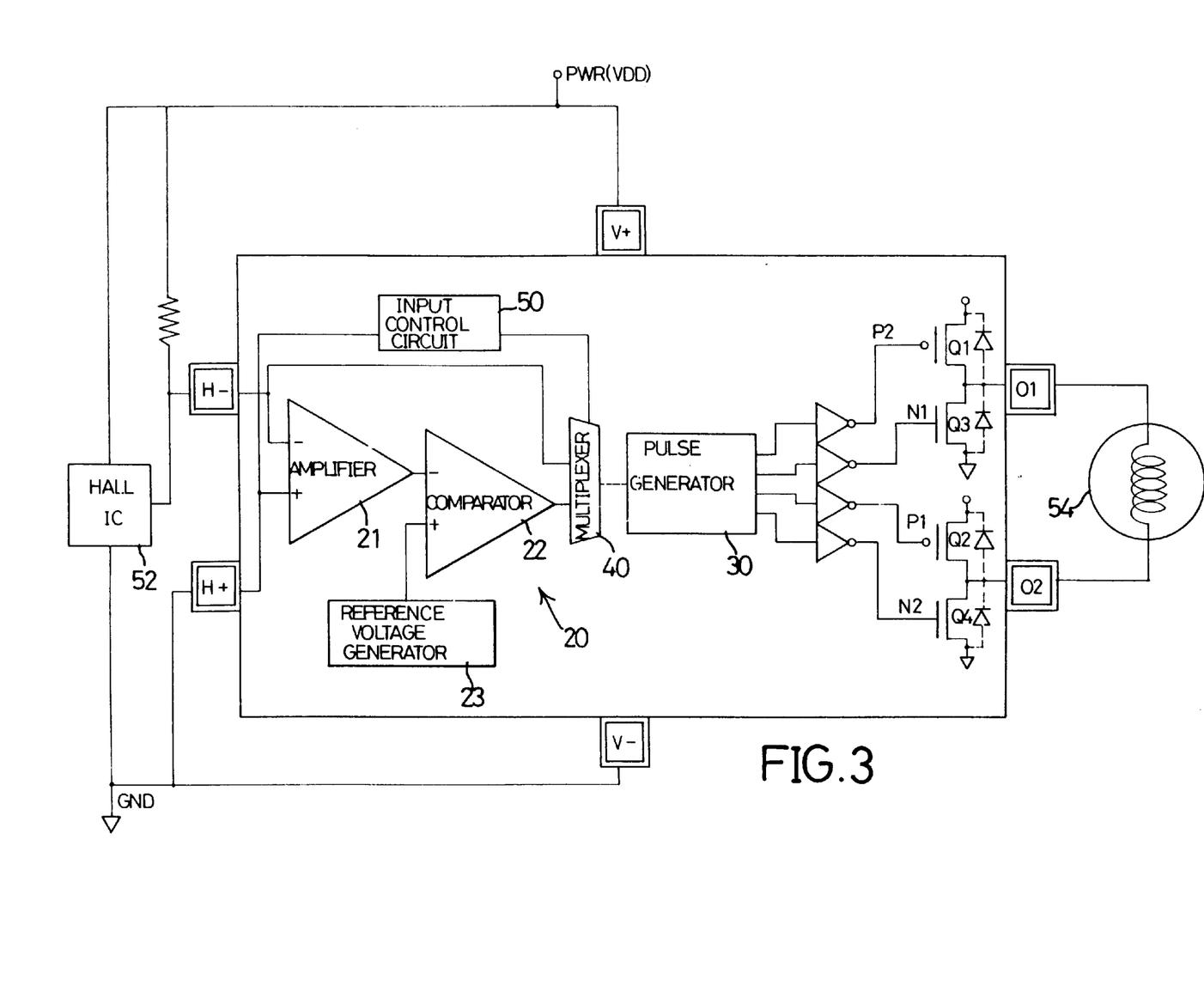
FIG. 3 is a circuit diagram of a first embodiment of the present invention wherein a Hall IC is used for detecting the polarity of a rotor.

Referring to FIG. 3, a Hall IC (52) is connected to the two signal input terminals (H+,H–) to operate with the motor drive circuit of the present invention. Because the signal input terminal H+ is connected to the ground line GND, the input of the inverter (51), as shown in FIG. 2, of the input control circuit (50) is a low voltage level and the output thereof is a high voltage level whereby one of the electronic switches 41 is closed, and thus the input of the pulse generator (30) is connected to the Hall IC (52) at the signal input terminal H–. Meanwhile, the other electronic switch 42 is open, and thus the output of the amplifying and comparing circuit (20) and the pulse generator (30) are disconnected.

Figure 4:
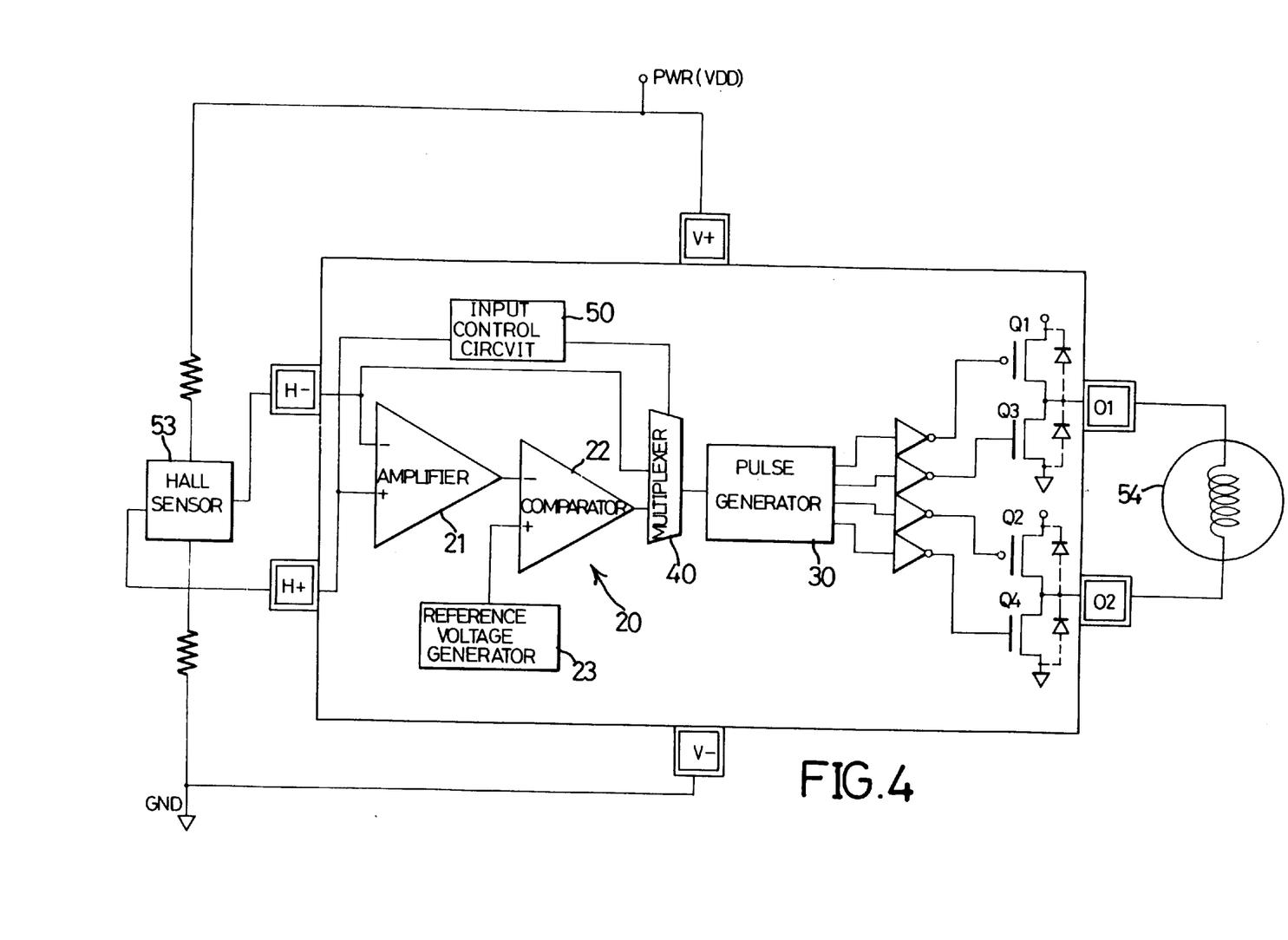
FIG. 4 is a circuit diagram of a second embodiment of the present invention wherein a Hall sensor is used for detecting the polarity of a rotor.

Referring to FIG. 4, a Hall sensor (53) is connected to the two input terminals (H+,H–) to operate with the motor drive circuit of the present invention. Because the two outputs of the Hall sensor (53) are respectively connected to the two signal input terminals (H+,H–), the input of the inverter (51), as shown in FIG. 2, of the input control circuit (50) is a high voltage level and the output thereof is a low voltage level whereby one of the electronic switches 42 is closed and the input of the pulse generator (30) is connected to the Hall sensor (53) at the signal input terminals (H+,H–) via the amplifying and comparing circuit (20). Meanwhile, the other electronic switch 41 is open. Moreover, to effectively determine the voltage level of the output signals from the Hall sensor (53), the inverter 51, as shown in FIG. 2, of the input control circuit (50) is a low-transition-level inverter which treats a low voltage level besides zero voltage as a high signal and performs a transition on it.

Therefore, it is to be understood that the motor drive circuit of the present invention can be used to operate with either a Hall sensor (53) or a Hall IC (52) by utilizing the input control circuit (50) to perform switch operations on the multiplexer (40).

Referring again to FIG. 1, each of the outputs of the pulse generator 30 is connected to the gate of one of the MOS transistors (Q1,Q2,Q3,Q4) via an inverter, wherein the transistors Q1 and Q2 are PMOS transistors and transistors Q3 and Q4 are NMOS transistors. The transistors Q1 and Q3 are connected together and form a first CMOS transistor set, while the transistors Q2 and Q4 are connected together and form a second CMOS transistor set. As shown in FIGS. 3 and 4, the contact point of the transistors Q1 and Q3 and that of the transistors Q2 and Q4 are respectively directed to two output terminals O1 and O2 which are connected to a motor coil (54) when the motor drive circuit is used to drive a single-phase motor.

Figure 5:
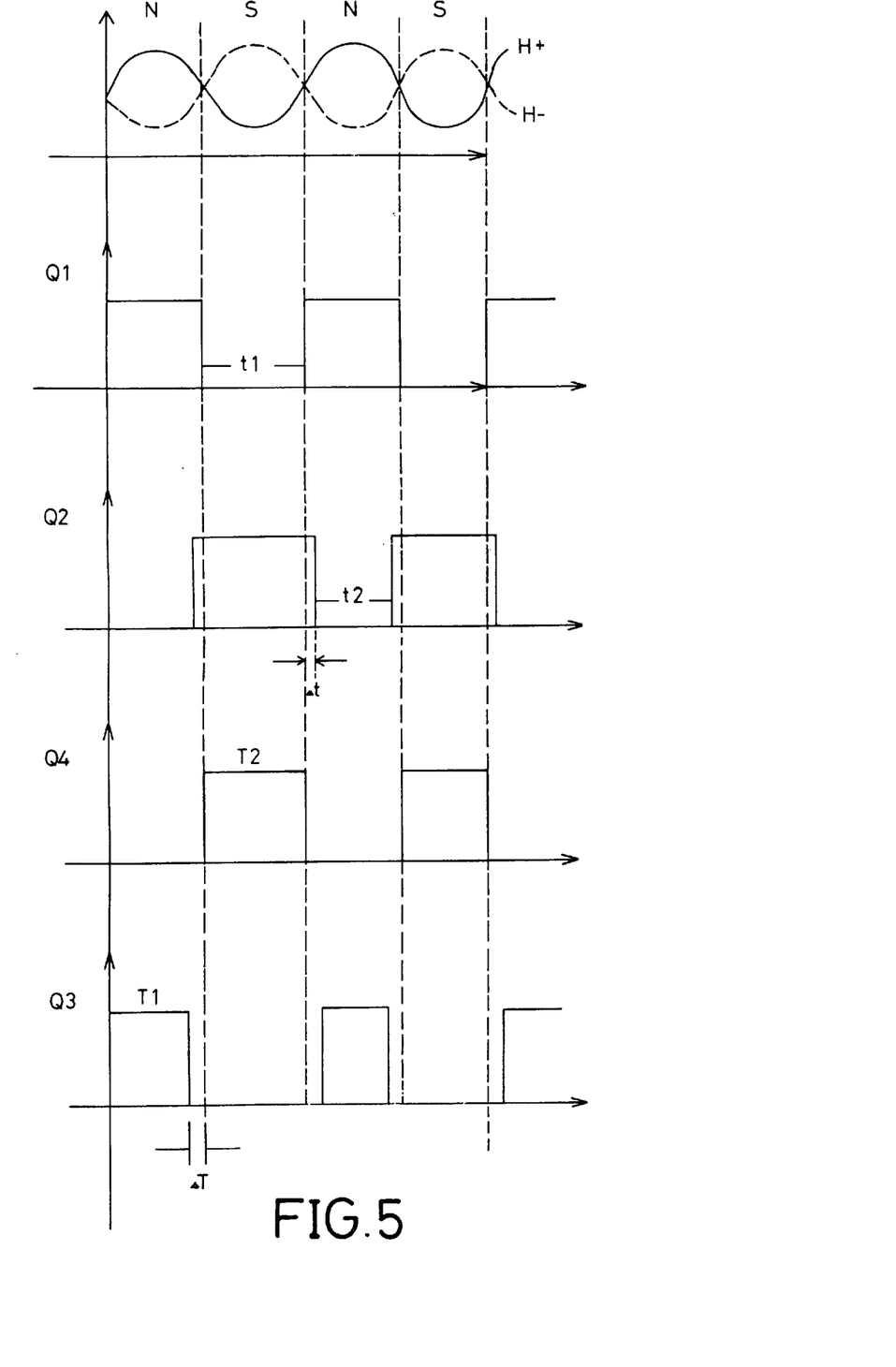
FIG. 5 shows the waveforms of the clock signals generated by a pulse generator of the motor drive circuit in accordance with the present invention.

The pulse generator (30) drives the transistors (Q1,Q2, Q3,Q4) by non-overlapping clock signals. Referring to FIG. 5, the clock signals to drive the transistors Q3 and Q4 are not overlapped at high voltage level and the clock signals to drive the transistors Q1 and Q2 are not overlapped at low voltage level. Therefore, when the clock signals to drive transistors Q3 and Q4 are in high states, there is a proper time interval ΔT asserted between an ON period T1 and a subsequent ON period T2 thereby preventing the two transistor sets from being turned on simultaneously. Similarly, when the clock signals to drive transistors Q1 and Q2 are in low states, there is also a proper time interval Δt asserted between an ON period t1 and a subsequent ON period t2 thereby preventing the two transistor sets from being turned on simultaneously.

Figure 6:
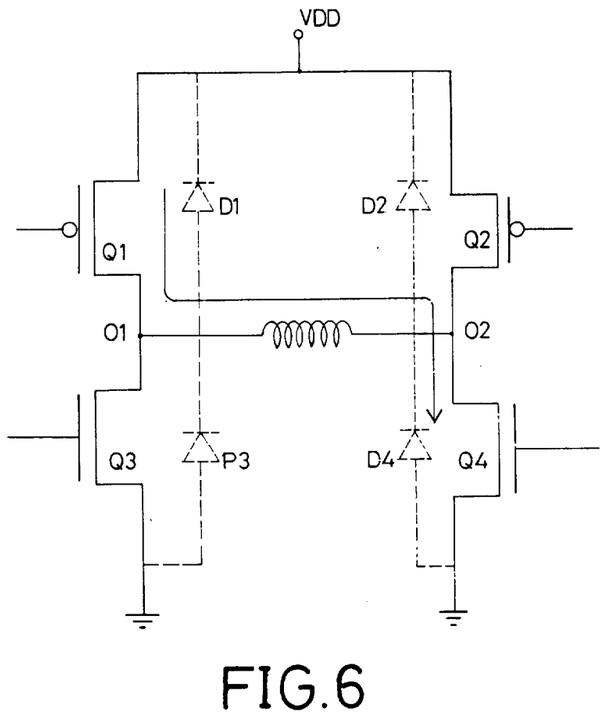
FIG. 6 is an equivalent circuit of the motor drive circuit for driving a motor.

FIG. 6 shows the interaction between the transistor sets of the motor drive circuit and the driven motor. The transistor Q1 is turned off when the transistor Q3 is on. When the ON period T1 of the transistor Q3 comes to an end, the time interval ΔT is generated before the subsequent ON period T2 is asserted to turn on the transistor Q4. Because the time interval ΔT exists between the two ON periods T1 and T2, it will not result in a short circuit problem in which the two transistor sets are turned on simultaneously.

Figure 7:
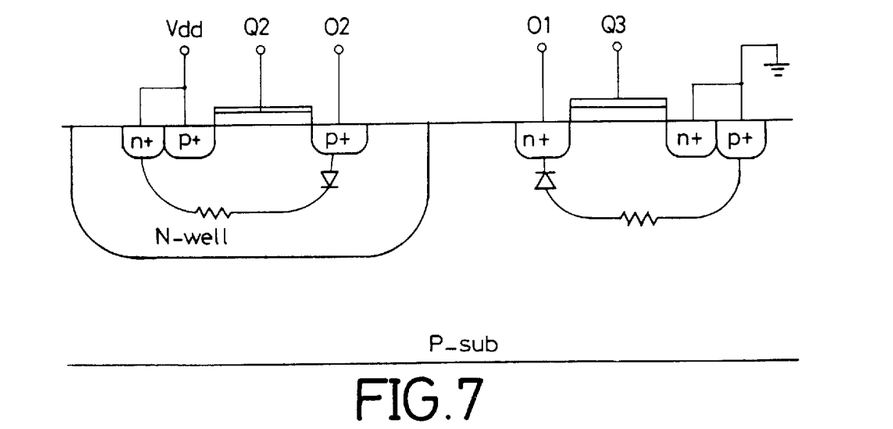
FIG. 7 is a cross-sectional view of a MOS transistor.

Although there are no diodes connected between the sources and drains of the transistors (Q1~Q4), the voltage spikes resulting from the counter electromotive force on the motor coil (54) can be eliminated by the parasitic diodes (D1~D4) formed in the process of manufacturing the MOS transistors (Q1~Q4) (referring to FIG. 7 for the cross-sectional views of PMOS and NMOS). Therefore, it is apparent that the voltage spikes and associated noise problems can be eliminated in the motor drive circuit of the present invention without having any external diodes.

Further, because of the PMOS transistors (Q1,Q2), each of the voltage drops between their power source and the output terminals O1 and O2 is small ($V_{DS}$ is about 0.2V), which provides advantages in having a small power loss and preventing over-heating in the motor drive circuit. It is known that the operation of a Hall sensor is significantly affected by temperature. Therefore, in the conventional skill, it is not suitable to embed a Hall sensor into an integrated circuit because temperature can not be effectively controlled. However, the present invention has overcome this problem and thus a Hall sensor can be fabricated with the motor drive circuit in an integrated circuit.

In addition, the design of the present invention can effectively reduce the number of circuit elements required thereby simplifying the fabrication process and lowering the manufacturing cost.

Figure 8:
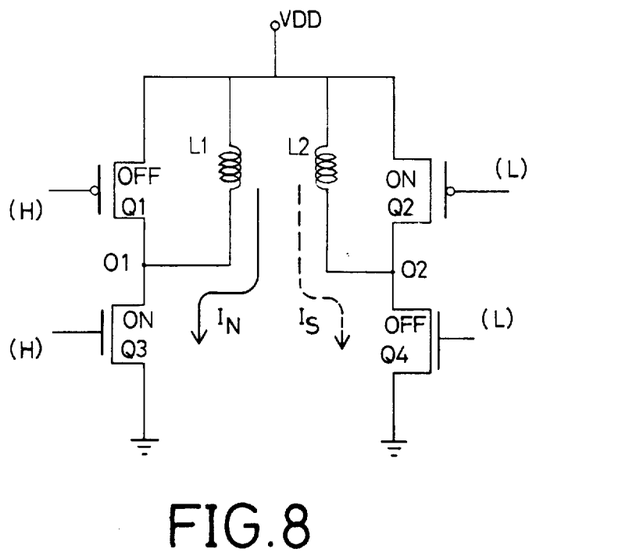
FIG. 8 is an equivalent circuit of the motor drive circuit which drives a two-phase motor.

Referring to FIG. 8, it is apparent that the motor drive circuit can also be used to drive a two-phase motor. Two first terminals of the two coils L1 and L2 of the motor are connected to the external terminals O1 and O2, respectively, and two second terminals thereof are connected to a power line $V_{DD}$ whereby the two transistor sets are alternatively turned on and off and the two coils (L1,L2) are excited alternatively to generate a rotating magnetic field to rotate the rotor of the motor.

According to the circuit architecture, operating sequence and operational characteristics of the motor drive circuit described above, the present invention has the following advantages:

1. Operating with both of the Hall sensor and Hall IC: By utilizing the input control circuit (50) to perform switch operations on the multiplexer (40), it is possible to have a single motor drive circuit operate with either a Hall sensor or a Hall IC to determine the polarity of a rotor.

2. Simplification in circuit architecture and manufacturing process: Since parasitic diodes (D1~D4) are formed with the MOS transistors (Q1~Q4), there is no need to have external diodes to eliminate voltage spikes caused by state transitions of the transistors. Therefore, the number of circuit elements can be reduced and the manufacturing process, simplified. Furthermore, the use of MOS transistors for power control can avoid the power dissipation problem caused by using NPN transistors and also solve the problem of having unsatisfactory characteristics when using PNP transistors due to restrictions in the manufacturing process.

3. Long operating life: Because the time interval inserted between an ON period and a subsequent ON period of the non-overlapping clocks generated by the pulse generator (30) prevents two transistor sets from being turned on simultaneously, the circuit operates normally thereby extending the useful life of the circuit.

4. Effectiveness in preventing false operation: Because the comparator (22) in the amplifying and comparing circuit (20) provides the hysteresis characteristic for noise rejection, false operations can always be rejected whereby guaranteeing the accuracy of circuit operation.

Although the present invention has been explained in relation to its preferred embodiments, it is to be understood that many other possible modifications and variations can be made without departing from the spirit and scope of the invention as hereinafter claimed.

What is claimed is:

1. A motor drive circuit for a DC brushless motor, comprising:
    an amplifying and comparing circuit having two inputs for receiving an output signal from a Hall element via a first and a second signal input terminals and an output for generating an amplified output signal;
    a multiplexer having two inputs and an output wherein said two inputs are respectively connected to said first signal input terminal and the output of said amplifying and comparing circuit for selecting a connection from one of said two inputs to said output;
    an input control circuit coupled between said multiplexer and said second signal input terminal to detect whether said Hall element is a Hall sensor or a Hall IC for controlling said multiplexer; and
    a drive pulse generator having an input connected to the output of said multiplexer and four outputs connected to four transistors respectively for generating clock signals to drive said four transistors for providing driving signals to said motor via two output terminals.

2. The motor drive circuit for a DC brushless motor as claimed in claim 1, wherein said input control circuit comprises:
    a first inverter having an input connected to said second signal input terminal and having an output connected to said multiplexer via a second inverter; and
    wherein said multiplexer comprises:
    two electronic switches having two first terminals both connected to said pulse generator and having two second terminals respectively connected said first signal input terminal and the output of said amplifying and comparing circuit.

3. The motor drive circuit for a DC brushless motor as claimed in claim 2, wherein the first inverter of said input control circuit is a low-transition-level inverter which treats a low voltage level besides zero voltage as a high signal to perform a transition.

4. The motor drive circuit for a DC brushless motor as claimed in claim 1, wherein each of said four transistors is of MOS type which has a parasitic diode formed in the fabrication process between source and drain thereby eliminating voltage spikes caused by transitions of said four transistors.

5. The motor drive circuit for a DC brushless motor as claimed in claim 1, wherein said clock signals generated by said pulse generator are non-overlapping signals.

6. The motor drive circuit for a DC brushless motor as claimed in claim 1, wherein said amplifying and comparing circuit comprises:

an amplifier for amplifying said output signal of said Hall element and generating an amplified output signal; and an comparator for comparing said amplified output signal with a reference voltage and providing a switching hysteresis for noise rejection.

* * * * *